(12) United States Patent
Gayaka

(10) Patent No.: US 12,298,782 B1
(45) Date of Patent: May 13, 2025

(54) SYSTEM FOR SENSOR FUSION FOR AUTONOMOUS MOBILE DEVICE

(71) Applicant: AMAZON TECHNOLOGIES, INC., Seattle, WA (US)

(72) Inventor: Shreekant Gayaka, San Jose, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 345 days.

(21) Appl. No.: 17/655,268

(22) Filed: Mar. 17, 2022

(51) Int. Cl.
  *G05D 1/246* (2024.01)
  *G05D 109/10* (2024.01)
  *G06F 18/2325* (2023.01)
  *G06F 18/25* (2023.01)

(52) U.S. Cl.
  CPC ......... *G05D 1/246* (2024.01); *G06F 18/2325* (2023.01); *G06F 18/251* (2023.01); *G05D 2109/14* (2024.01)

(58) Field of Classification Search
  CPC .... G05D 1/0238; G06F 18/232; G06F 18/251
  See application file for complete search history.

(56) References Cited

U.S. PATENT DOCUMENTS

| | | | | |
|---|---|---|---|---|
| 9,225,793 B2* | 12/2015 | Dutta | ....................... | H04L 67/12 |
| 11,341,185 B1* | 5/2022 | Hamid | ..................... | G10L 25/57 |
| 11,422,565 B1* | 8/2022 | Webster | ............... | G05D 1/0088 |
| 11,662,722 B2* | 5/2023 | Dooley | ................ | G05D 1/0088 |
| | | | | 700/259 |
| 2020/0001475 A1* | 1/2020 | Dooley | .................. | H04N 23/63 |
| 2020/0225673 A1* | 7/2020 | Ebrahimi Afrouzi | ........................ | |
| | | | | A47L 11/4011 |
| 2021/0157318 A1* | 5/2021 | Takai | ...................... | G06V 40/10 |
| 2022/0005332 A1* | 1/2022 | Metzler | ............... | G06F 18/2431 |
| 2022/0244734 A1* | 8/2022 | Taira | .................... | G05D 1/0274 |
| 2022/0250250 A1* | 8/2022 | Oda | ........................ | B25J 9/1697 |

* cited by examiner

*Primary Examiner* — Scott A Browne
*Assistant Examiner* — Lidia Kwiatkowska
(74) *Attorney, Agent, or Firm* — Lindauer Law, PLLC

(57) ABSTRACT

A physical space includes obstacles with different characteristics. Different sensors may detect some obstacles well, while other obstacles are poorly detected. An autonomous mobile device (AMD) uses data from various sensors to determine information about the physical space that is expressed in layers. Each layer represents specified areas within at least a portion of the physical space, with each area having a value representative of whether an obstacle is present. Some layers may represent specific volumes, or height ranges. For example, different layers may represent a low height, a medium height, and a high height. Aggregated data may be determined using the values from multiple layers. The aggregated data may be calculated using an aggregation profile to specify a relative weighting for the values in a particular layer. The aggregated data may then be processed to determine maps, such as a navigation map for autonomous movement, floorplan, and so forth.

20 Claims, 8 Drawing Sheets

Sensor Characteristics 202

| Type 204 | Direction of FOV 206 |
|---|---|
| Stereo Depth Camera (SDC) | Fixed Front Forward |
| Single Point Time of Flight (SPTOF) | Fixed Front Forward, Front Down |
| Multipoint Time of Flight (MPTOF) | Fixed Front Forward |
| Ultrasound Sensor (USS) | Fixed Front, Back, Left, Right |
| RGB Camera (RGB) | Pan/Tilt Front |
| ... | ... |

Layer Characteristics 210

| Layer Type 212 | Source Sensor(s) 214 | Layer Data 146 |
|---|---|---|
| Visual | RGB | <ARRAY1> |
| Time of Flight | SPTOF | <ARRAY2> |
| Ultrasound | USS | <ARRAY3> |
| Dynamic Object | RGB, SDC, MPTOF | <ARRAY4> |
| Hard to See Object | RGB, SDC | <ARRAY5> |
| Semantic – Fixed | RGB, MPTOF, USS | <ARRAY6> |
| Semantic – User | RGB, MPTOF, SDC | <ARRAY7> |
| High Height Layer | MPTOF, SDC | <ARRAY8> |
| ... | ... | ... |

Aggregation Profiles 148

| Profile Type 220 | Layer Weight Values 222 {layer1, layer2, ...} |
|---|---|
| Navigation | {1, 0.6, 3, ...} |
| Occupancy | {0.9, 1, 2, ...} |
| ... | ... |

FIG. 2

SYSTEM FOR SENSOR FUSION FOR AUTONOMOUS MOBILE DEVICE

BACKGROUND

An autonomous mobile device (AMD) moves throughout a physical space. To facilitate this movement, the AMD gathers information about the physical space to determine maps used to perform tasks, such as moving in the physical space.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features. The figures are not necessarily drawn to scale, and in some figures, the proportions or other aspects may be exaggerated to facilitate comprehension of particular aspects.

FIG. 2 illustrates layer data and other data associated with operation of the system, according to some implementations.

Figure 1:
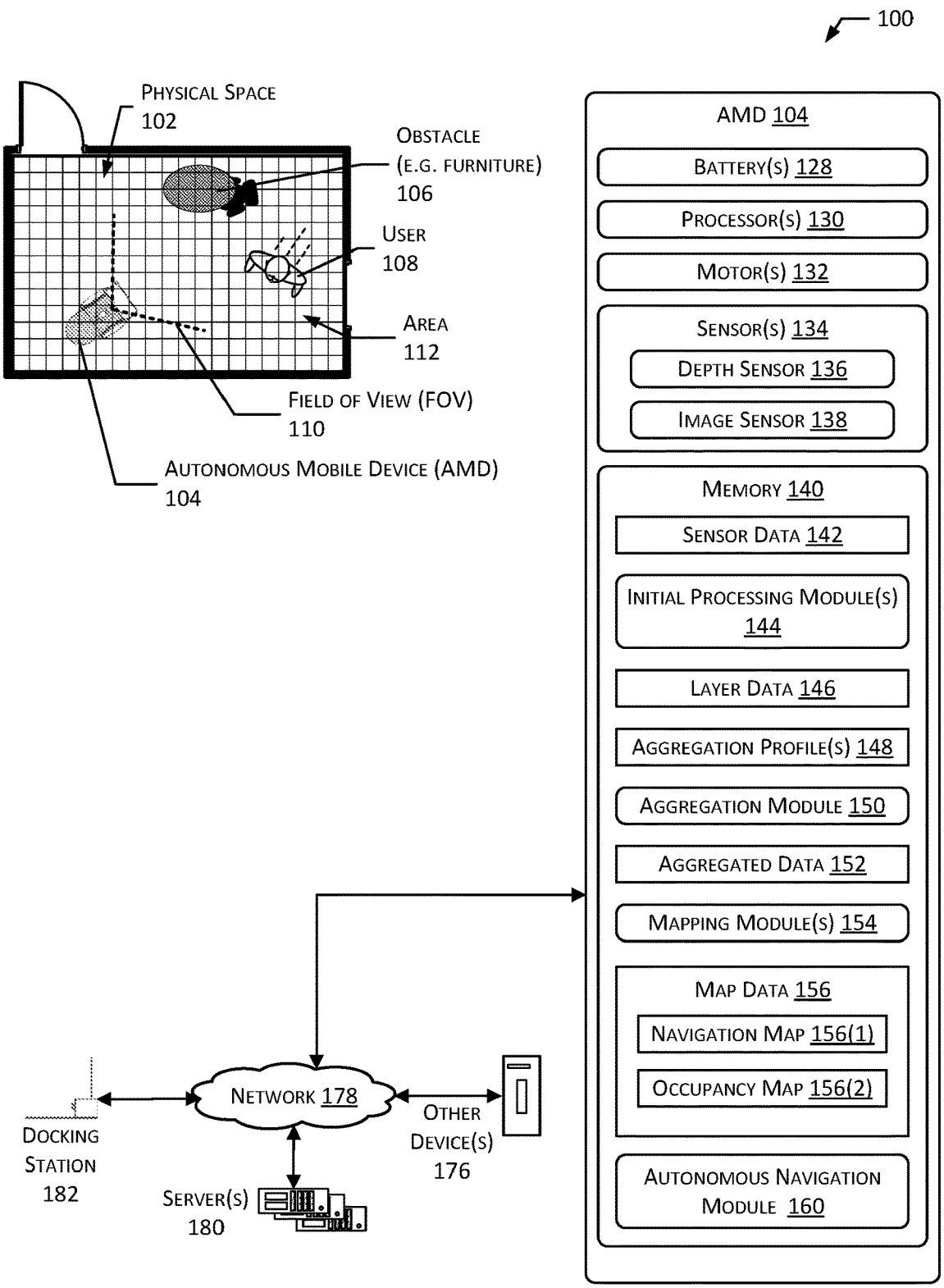
FIG. 1 illustrates a system for determining layer data about a physical space with an autonomous mobile device (AMD), according to some implementations.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean "including, but not limited to".

DETAILED DESCRIPTION

An autonomous mobile device (AMD) such as a robot is capable of performing tasks. These tasks may include autonomous movement in which the AMD moves between locations in a physical space without being driven or controlled by a user. Autonomous movement uses information about the physical space, such as maps indicating where obstacles such as objects, ledges, and so forth are located. For example, an occupancy map indicating the locations of obstacles may be used to determine a path plan between locations in the physical space.

The obstacles in the physical space may have different characteristics. For example, the shape, color, texture, hardness, and so forth of different objects in the physical space may vary. Sensors may be used to detect obstacles, providing data that may be used to determine maps or other information about the physical space. Different sensors may use different modalities to operate and may provide different information with different resolution. Modalities may be differentiated based on whether the sensor is active or passive, spatial resolution of the data produced, or other considerations. Different modalities may detect some obstacles more effectively than other modalities.

Some sensors are passive, acquiring signals reflected or emitted by an obstacle. For example, a camera may be used to acquire images of a scene using ambient light. A stereocamera may be used to determine depth information. However, a stereocamera may be unable to provide reliable depth information if the object is transparent or reflective.

Some sensors may emit a signal and detect a reflection from an obstacle. For example, an optical time of flight (TOF) sensor may emit a pulse of light and detect a reflection. Based on the time for that pulse to travel to the obstacle and be reflected back, a distance to the obstacle may be calculated. However, an optical TOF sensor may be unable to detect an obstacle that is transparent to the light, such as a glass door or table. In comparison, an acoustic TOF sensor such as an ultrasound sensor (USS) may use a sound pulse, while an electromagnetic TOF sensor such as radar uses a radio wave pulse.

Sensors may also provide data with different resolutions. For example, the camera may produce a color image with 1920×1080 pixels, while the USS may produce a single point of data indicative of a distance to an obstacle that is anywhere within its field of view.

Traditional sensor fusion techniques to combine data from different sensors have typically relied on fixed configurations of sensors and fixed algorithms that attempt to combine data from different sensors into a single representation. These traditional techniques are complex and prone to fail as more complex physical spaces are encountered. For example, a new piece of furniture added to a physical space may no longer comport with the assumptions made in the fixed algorithms, resulting in a failure to reliably characterize this obstacle. These traditional techniques are also prone to overall failure if one of the sensors is unavailable due to failure or deactivation for other reasons such as privacy concerns.

Described in this disclosure is a system and techniques for storing information associated with different modalities in layers that are aligned to and representative of areas in the physical space. Layers may be associated with different sensor modalities or information derived from those sensor modalities. For example, a first layer may contain information derived from a stereovision camera, while a second layer contains information from the USS, a third layer contains semantic information based on image data from a camera, and so forth. Different layers may be used to stored information obtained using the same modality, but associated with different heights. For example, a low layer may contain information about obstacles that are small enough that the AMD can pass over them. Similarly, a high layer may contain information about obstacles that would obstruct the AMD when in a maximum height configuration, such as when a mast is extended.

In some implementations, data within a layer may also be modified over time using a hysteresis function in which changes over time to a particular area modify the value of the particular area asymmetrically. For example, the first layer may use a first hysteresis function in which increases from one time to the next of values of a particular area result in a slow increase to the value of that area, while decreases occur more rapidly. Continuing the example, the second layer may use a second hysteresis function that is the opposite, fast to increase and slow to decrease.

Once stored, the information in these layers may be selectively aggregated to provide aggregated data. The aggregated data may be subsequently used to determine information such as occupancy maps indicative of fixed obstacles, navigation maps about fixed and moving obstacles, and so forth. For example, a first set of aggregated data may be used to determine an occupancy map, while a second set of aggregated data may be used to determine a navigation map. Different aggregation profiles may be used to specify the weight values of particular layers, allowing aggregated data to be tailored for subsequent use.

By using the systems and techniques described in this disclosure, the AMD is able to reliably determine information about a physical space and perform tasks, such as autonomously moving through the space. The system is flexible, allowing layers to be readily added and removed. As a result, modalities may be readily added and removed. Likewise, aggregation profiles may be modified without changing data in the corresponding layers. This allows the resulting aggregation data to be tailored to subsequent systems, improving the results of later processing.

Illustrative System

FIG. 1 illustrates a system 100 for determining layer data about a physical space 102 with an AMD 104, according to some implementations. The AMD 104 is shown in a physical space 102 that includes a user 108 and an obstacle 106. For processing purposes, the physical space 102 may be divided into a plurality of areas 112. In this figure the area(s) 112 are depicted as squares arranged in a grid pattern. In other implementations, other tessellations or arrangements may be used.

The AMD 104 may include one or more batteries 128, one or more processors 130, one or more motors 132, sensors 134, and memory 140. Other components of the AMD 104 are discussed with regard to FIG. 7.

The one or more sensors 134 may have different fields of view (FOV), including an example FOV 110. For example, a depth sensor 136 may have a first field of view and an image sensor 138 may have a second field of view. A FOV 110 is the extent of the physical space 102 represented by sensor data 142 acquired using one or more sensors 134.

The AMD 104 uses the sensors 134 to acquire sensor data 142 about the physical space 102. For example, the sensors 134 may include a depth sensor 136, an image sensor 138, and so forth. The corresponding sensor data 142 may include point cloud data and image data. Additional sensors 134 are discussed with regard to FIG. 8. The sensor data 142 may be stored in the memory 140.

Different sensors 134 may use different modalities and may provide different information with different resolution. Modalities may be differentiated based on whether the sensor 134 is actively emitting a signal or passively receiving a signal, the spatial resolution of the resulting sensor data 142, type of information stored, or other considerations. Different modalities may detect some obstacles more effectively than other modalities. For example, an optical time of flight sensor may reliably detect walls and doors but may not detect windows and mirrors. In comparison, an ultrasound sensor (USS) may reliably detect windows and mirrors but may not detect soft furnishings such as pillows and cushions.

One or more initial processing modules 144 may be stored in the memory 140. The initial processing module 144 accepts as input sensor data 142 and provides as output layer data 146 that may also be stored in the memory 140. The initial processing module(s) 144 may utilize one or more filters, algorithms, trained neural networks, or other techniques to process the sensor data 142.

In some implementations, layer data 146 is representative of a plurality of the areas 112 in the physical space 102. A value is associated with each of the areas 112 in the plurality of areas 112. In some implementations, the value may be a log-odds value that is representative of a probability that the area 112 includes an obstacle 106. In one implementation, the layer data 146 may comprise a two-dimensional array. The layer data 146 is discussed in more detail with regard to the following figures.

The memory 140 may also store one or more aggregation profiles 148 and an aggregation module 150. The aggregation module 150 may accept as input the layer data 146 and provide as output aggregated data 152. The aggregation profile 148 specifies a weight value that is associated with specified layer data 146. The weight values in the aggregation profile 148 allow information associated with the specified layer data 146 to be emphasized or attenuated in the resulting aggregated data 152. For example, the aggregated data 152 for an area 112 may be the sum of the products of individual values for each layer data 146 as multiplied by the weight value specified by the aggregation profile 148. In other implementations, other techniques may be used to determine the aggregated data 152.

The aggregated data 152 may be provided as input to other modules, such as one or more mapping modules 154. The mapping modules 154 may provide as output map data 156. For example, a first mapping module 154 may be used to determine a navigation map 156(1) indicative of obstacles 106, an occupancy map 156(2) indicative of stationary obstacles 106 such as walls and furnishings, and so forth. An obstacle 106 may comprise a physical obstacle or feature that prevents or impairs traversal by the AMD 104. For example, an obstacle 106 may comprise a wall, stairwell, pet, and so forth. In some implementations, the mapping module 154 may designate a particular area 112 as including an obstacle 116 if the value of aggregated data 152 for a particular area 112 is greater than or equal to a threshold value. If the value of the aggregate data 152 is less than the threshold value, then the particular area 112 may be deemed to not include an obstacle 106.

The map data 156 may comprise a representation of the physical space 102 that includes the obstacles 106 and their locations in the physical space 102. During operation, the mapping module(s) 154 may use the sensor data 142 or the aggregated data 152 to determine information such as where the AMD 104 is, how far the AMD 104 has moved, the presence and location of different types of objects, and so forth.

The mapping module(s) 154 may include a simultaneous localization and mapping (SLAM) module. Localization is determining where the AMD 104 is in the physical space 102 and may utilize some external reference. For example, cameras may acquire images. These images are processed to determine the presence of features in the images, such as edges of doors, shadows on the wall, texture on the walls, and so forth.

The map data 156 may be implemented using any data structure that provides for storage and modification of data. For example, map data 156 be managed by one or more arrays, one or more database records, one or more lists, one or more data objects, one or more graphs, and so forth.

An autonomous navigation module 160 provides the AMD 104 with the ability to navigate within the physical space 102 without real-time human interaction. The autonomous navigation module 160 may implement, or operate in conjunction with, the mapping module(s) 154. The autonomous navigation module 160 may generate path plan data that is indicative of a path through the physical space 102 from the current location to a destination location using one or more of the navigation map 156(1) or the occupancy map 156(2). The AMD 104 may then begin moving along the path.

The sensors 134 may continue to provide sensor data 142 during operation of the AMD 104. The layer data 146 may be updated as subsequent sensor data 142 is processed by the initial processing module 144. Aggregated data 152 may then be produced and the mapping module(s) 154 may provide new or updated map data 156 to the autonomous navigation module 160 or other systems.

The AMD 104 may use a network interface to connect to a network 178. For example, the network 178 may comprise a wireless local area network, that in turn is connected to a wide area network such as the Internet.

The AMD 104 may be configured to dock or connect to a docking station 182. The docking station 182 may provide external power which the AMD 104 may use to charge the battery 128 of the AMD 104.

The docking station 182 may also be connected to the network 178. For example, the docking station 182 may be configured to connect to the wireless local area network 178 such that the docking station 182 and the AMD 104 may communicate.

The AMD 104 may access one or more servers 180 via the network 178. For example, the AMD 104 may utilize a wakeword detection module to determine if the user 108 is addressing a request to the AMD 104. The wakeword detection module may hear a specified word or phrase and transition the AMD 104 or portion thereof to the wake operating mode. Once in the wake operating mode, the AMD 104 may then transfer at least a portion of the audio spoken by the user 108 to one or more servers 180 for further processing. The servers 180 may process the spoken audio and return to the AMD 104 data that may be subsequently used to operate the AMD 104.

The AMD 104 may also communicate with other devices 176. The other devices 176 may include one or more devices that are within the physical space 102 such as a home or associated with operation of one or more devices in the physical space 102. For example, the other devices 176 may include a doorbell camera, a garage door opener, a refrigerator, washing machine, and so forth. In some implementations, the other devices 176 may include other AMDs 104, vehicles, and so forth.

In other implementations, other types of autonomous mobile devices (AMD) may use the systems and techniques described herein. For example, the AMD 104 may comprise an autonomous ground vehicle that is moving on a street, an autonomous aerial vehicle in the air, autonomous marine vehicle, and so forth.

FIG. 2 illustrates at 200 layer data 146 and other data associated with operation of the system, according to some implementations.

Sensor characteristics 202 comprising information about sensors 134 available to the AMD 104 are depicted, including type 204 and direction of FOV 206. The AMD 104 may include one or more sensors 134 of various types 204. For example, the types 204 may comprise a stereo depth camera (SDC), single point time of flight (SPTOF), multipoint time of flight (MPTOF), ultrasound sensor (USS), red-green-blue camera (RGB), and so forth. These sensors 134 on the AMD 104 may have a respective direction 206 of their respective FOV 110. For example, an RGB camera may have a direction of FOV 206 that is fixed and pointed forward, relative to a chassis of the AMD 104. In another example, a SPTOF sensor used for cliff detection on the front of the AMD 104 may have a front down direction of FOV 206 to try and detect cliffs ahead of the AMD 104 during movement.

The different sensors 134 of the AMD 104 may thus have different directions of FOV 206 and different FOVs 110 individually. Depending on the sensors 134 used and their individual FOV 110 and direction of FOV 206, it is possible for the AMD 104 to have portions of the physical space 102 for which sensor data 142 is unavailable at a particular time. For example, if the AMD 104 has SDC on the front of the chassis that is fixed pointed forward, the SDC is unable to provide information about the area behind the AMD 104 that is outside of the SDC FOV 110. As the AMD 104 moves, different portions of the physical space 102 may be within the FOV 110 of various sensors 134, allowing sensor data 142 to be acquired about these areas.

Also depicted are layer characteristics 210. Each layer of the layer data 146 may be associated with a particular layer type 212. For example, the layer types 212 may include visual, time of flight, ultrasound, dynamic object, hard to see object, semantic fixed object, semantic user, semantic class of obstacle, high height layer, and so forth. For example, a trained machine learning system may be used to specify a semantic class such as "user", "table", "wall", "door", "fixed", and so forth a particular obstacle 106. Layer data 146 may also be associated with one or more source sensors 214 that provide sensor data 142 that is used to determine the layer data 146. In some implementations, layer data 146 may be based on data other than sensor data 142. For example, layer data 146 may be manually entered by a human operator.

The layer type 212 may be indicative of the type of information that is stored in the corresponding layer data 146. For example, the visual layer type 212 may indicate that the corresponding layer data 146 provides data based on processing image data from the RGB camera. In another example, the dynamic object layer type 212 may indicate that the corresponding layer data 146 is representative of objects that are expected to be in motion in the physical space 102.

Layer data 146 may be based on data from a single sensor, one or more sensors, based on data processing of the sensor data 142 from those sensors, or other sources. Different layers of layer data 146 may thus be representative of obstacles 106 having different attributes of the physical space 102, at different heights in the physical space 102 as discussed with regard to FIG. 6, and so forth.

The layer data 146 is shown here as separate arrays of data. These arrays may comprise two or more dimensions. Each entry in the array may be associated with a corresponding particular area 112 in the physical space 102. Each entry in the array may comprise a value that is representative of a likelihood that an obstacle 106 is present in the corresponding particular area 112. In some implementations, the value may be a log-odds value that is representative of a probability that the area 112 includes an obstacle 106. In other implementations, other data structures or storage constructs may be used.

Also depicted in this figure are examples of aggregation profiles 148. The aggregation profile 148 may be indicative of a profile type 220 that is indicative of an intended use or module that will subsequently consume the aggregated data 152 that is determined using the aggregation profile 148. One or more layer weight values 222 are associated with a profile type 220. The layer weight values 222 comprise values that are associated with respective layers, or sets of layer data 146. By selecting a particular value of a layer weight value 222, the resulting aggregated data 152 may emphasize some layer data 146 while deemphasizing other layer data 146. For example, in implementations where the aggregation module 150 uses a weighted sum to determine the aggregated data 152, a layer weight value that is less than 1 will result in de-emphasis of the corresponding layer data 146, a layer weight value that is greater than 1 will result in emphasis of the corresponding layer data 146, and so forth.

Different aggregation profiles 148 allow for different aggregated data 152 to be determined that is suited to a specified purpose. For example, the profile type 220 that is associated with "navigation" may have different layer weight values 222 than the profile type 220 that is associated with "occupancy".

Figure 3:
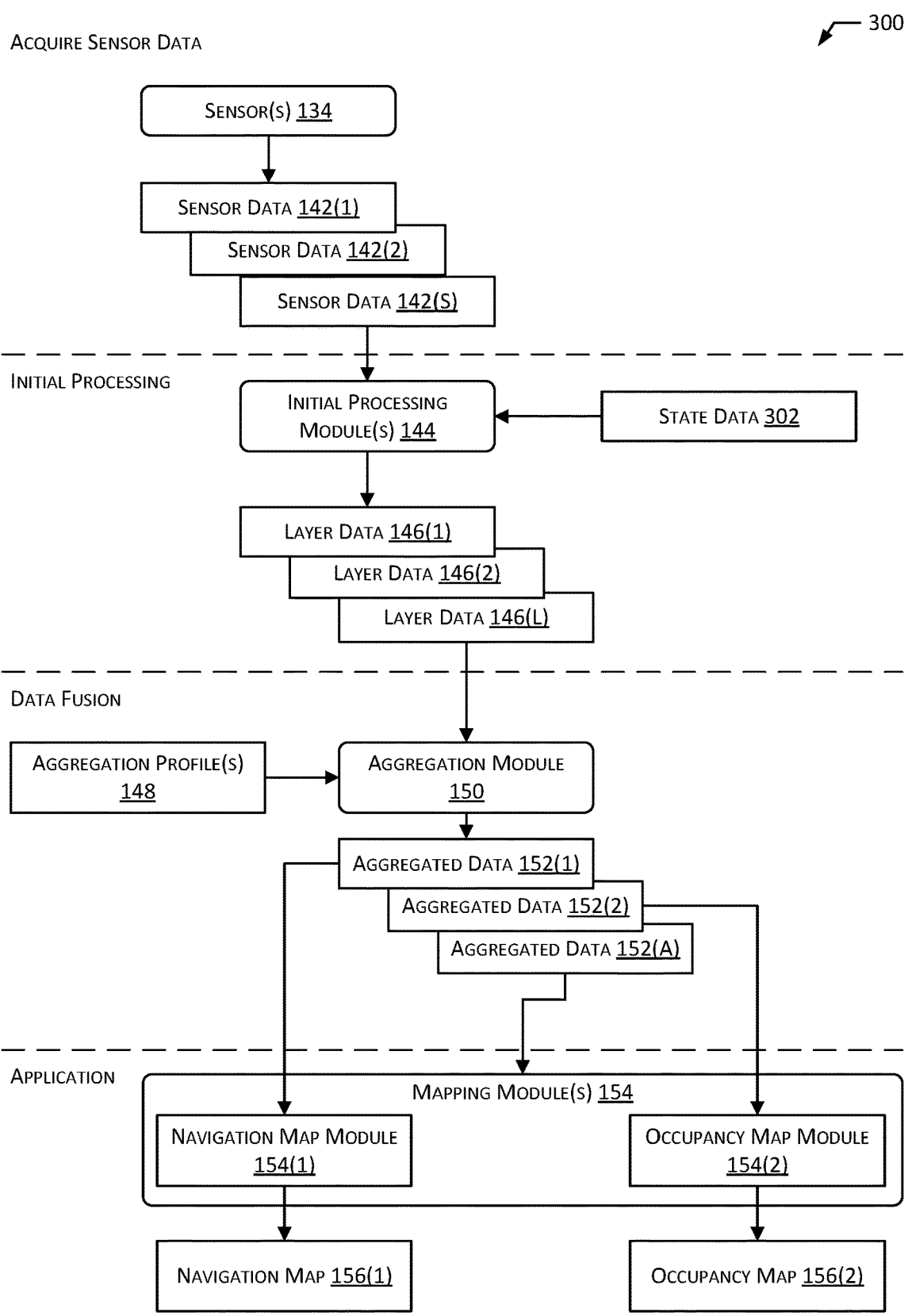
FIG. 3 is a flow diagram of a process for determining and using layer data, according to some implementations.

FIG. 3 is a flow diagram 300 of a process for determining and using layer data 146, according to some implementations. During a first phase of the process sensor data 142 is acquired. One or more sensors 134 provide sensor data 142(1), 142(2), . . . , 142(S) as output.

During a second phase of the process initial processing is performed. The sensor data 142 is processed by one or more initial processing modules 144 to determine layer data 146(1), 146(2), . . . , 146(L). The initial processing module(s) 144 may utilize one or more filters, algorithms, trained neural networks, or other techniques to process the sensor data 142.

The initial processing module(s) 144 may also use state data 302. The state data 302 may comprise information such as a current pose of the AMD 104, indicating a location in the physical space 102 with respect to a specified origin, orientation in the physical space 102 with respect to a specified direction, and so forth. For example, the state data 302 may comprise coordinates of the AMD 104 in three dimensional space relative to three orthogonal axes and rotation values with respect to those axes. The state data 302 may be used to align and orient the sensor data 142 to a common reference system, such as the specified areas 112.

In one example, an initial processing module 144 may accept state data 302 and sensor data 142 from a USS, process it using a thresholding algorithm, determine one or more areas 112 of the physical space 102 that the sensor data 142 corresponds to, and provide as output layer data 146 indicating a distance and location of an obstacle 106 detected by the USS. In another example, the initial processing module 144 may use a trained neural network to process RGB image data and provide semantic data indicative of whether a user 108 is present within the image data. Continuing the example, the state data 302 is used to align and orient the resulting information to determine the layer data 146.

Different combinations of sensors 134 and initial processing modules 144 may be used. In one implementation, each sensor 134 may provide sensor data 142 to a specified initial processing module 144. In another implementation, a set of sensors 134 of the same type 204 may provide sensor data 142 to a specified initial processing module 144. In another implementation, two or more sensors 134 of different types 204 may provide input to a specified initial processing module 144.

During a third phase of the process data fusion is performed. The layer data 146(1), . . . , 146(L) is processed by an aggregation module 150 to determine aggregated data 152(1), 152(2), . . . 152(A). One or more aggregation profiles 148 may be used by the aggregation module 150 to determine the respective aggregated data 152. Based on the layer weight values 222 of the aggregation profiles 148, different aggregated data 152 may be provided for use in the next phase.

During the fourth phase of the process the aggregated data 152 is used by subsequent applications such as mapping. In this figure first aggregated data 152(1) is provided to a navigation map module 154(1) to determine the navigation map 156(1). Also shown in this figure the second aggregated data 152(2) is provided to an occupancy map module 154(2) to determine the occupancy map 156(2). The AMD 104 may then be operated using the resulting data. For example, the navigation map 156(1) may be used by the autonomous navigation module 160 to determine where the AMD 104 is to move in the physical space 102.

The process of FIG. 3 as depicted may be representative of a particular period of time. For example, the process may be performed 30 times per second, providing aggregated data 152(1), 152(2), . . . , 152(A) 30 times per second.

The execution of the phases in the process shown may or may not be performed with lockstep timing. The various phases may operate on different timing schedules. Buffers may be used to convey information between the phases. For example, some sensors 134 may provide sensor data 142 at a rate of 120 times per second, while others provide sensor data 142 at a rate of 10 times per second. The sensor data 142 may be stored in buffers until consumed by the respective initial processing module(s) 144. Continuing the example, the mapping modules 154 or other users of the aggregated data 152 may operate at a rate of 15 times per second, accessing the aggregated data 152 as needed.

Figure 4:
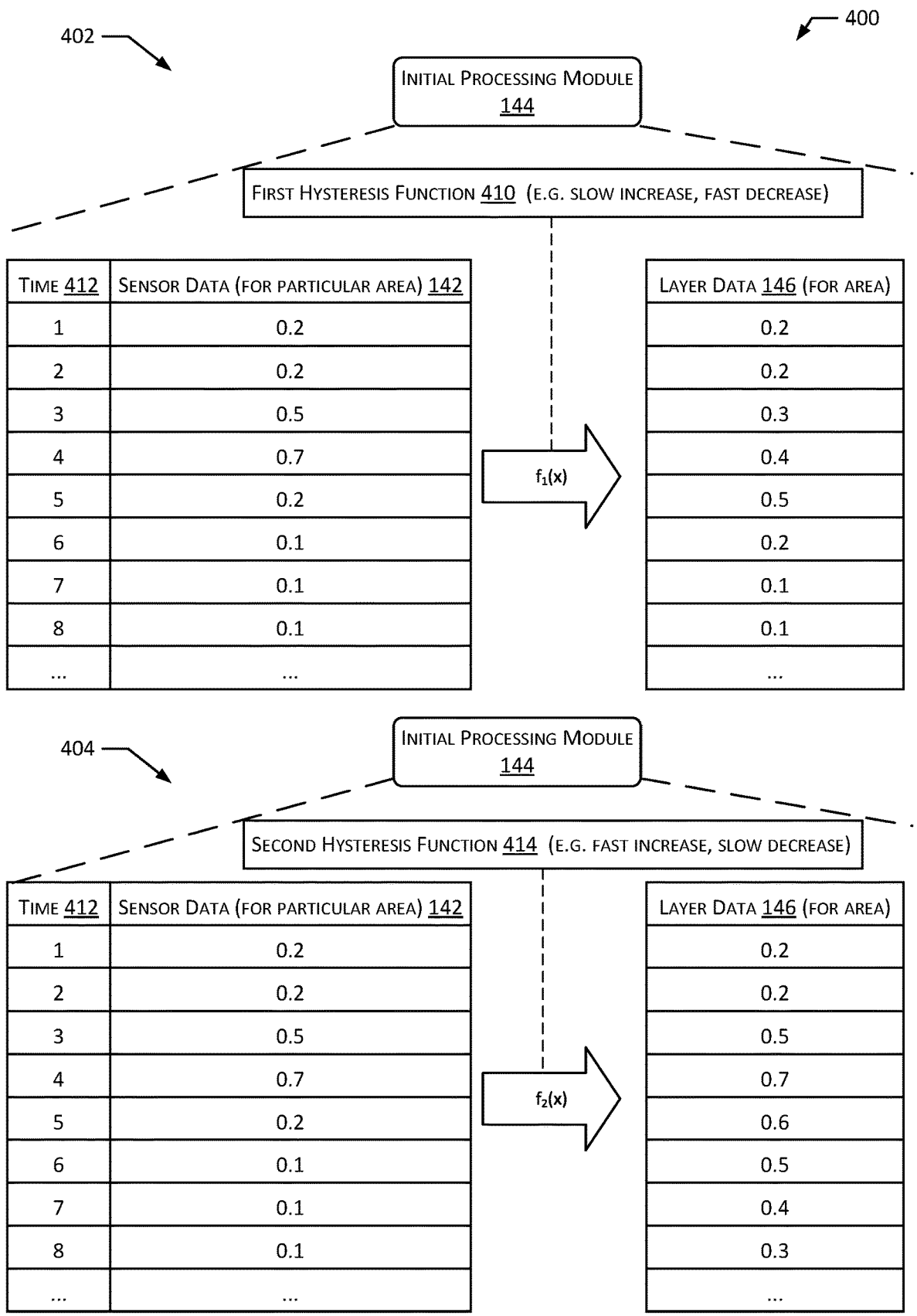
FIG. 4 illustrates processing sensor data with different hysteresis functions to determine layer data, according to some implementations.

FIG. 4 illustrates at 400 processing sensor data 142 with different hysteresis functions to determine layer data 146, according to some implementations.

In this figure, the same initial processing module 144 is shown processing the same sensor data 142 for times 412(1)-(8) using two different hysteresis functions and the resulting layer data 146. For ease of illustration, and not as a limitation, the layer data 146 for a single area 112 is depicted.

At 402 the initial processing module 144 uses a first hysteresis function 410. The first hysteresis function 410 provides for an asymmetric change output value for the layer data 146 responsive to input sensor data 142. In this example, the first hysteresis function 410 provides for a relatively slow increase (slow ramp up) responsive to increases in values of sensor data 142 and a relative fast decrease (fast ramp down) responsive to decreases in values of the sensor data 142.

At 404 the initial processing module 144 uses a second hysteresis function 414. The second hysteresis function 414 also provides for an asymmetric change output value for the layer data 146 responsive to input sensor data 142. In this example, the second hysteresis function 414 provides for a relatively fast increase (fast ramp up) responsive to increases in values of sensor data 142 and a relatively slow decrease (slow ramp down) responsive to decreases in values of the sensor data 142.

In some implementations, the hysteresis function used by the initial processing module 144 may be changed from one time to another. For example, the first layer data 146(1) may be generated at a first time using the first hysteresis function 410 while at a second time the first layer data 146(1) is generated using the second hysteresis function 414. Continuing the example, the change in hysteresis function used may be based on an operating mode of the AMD 104, task being performed, or other factor.

Different layers of the layer data 146 may be determined using different hysteresis functions. For example, the first layer data 146(1) may be determined using the first hysteresis function 410, a fourteenth layer data 146(14) may be determined using a seventh hysteresis function, and so forth.

In other implementations, the initial processing module 144 may use other functions to process the sensor data 142 or data based thereon to determine the layer data 146. For example, a symmetrical function may use a symmetrical rise and decay value to determine the values of the layer data 146.

Figure 5:
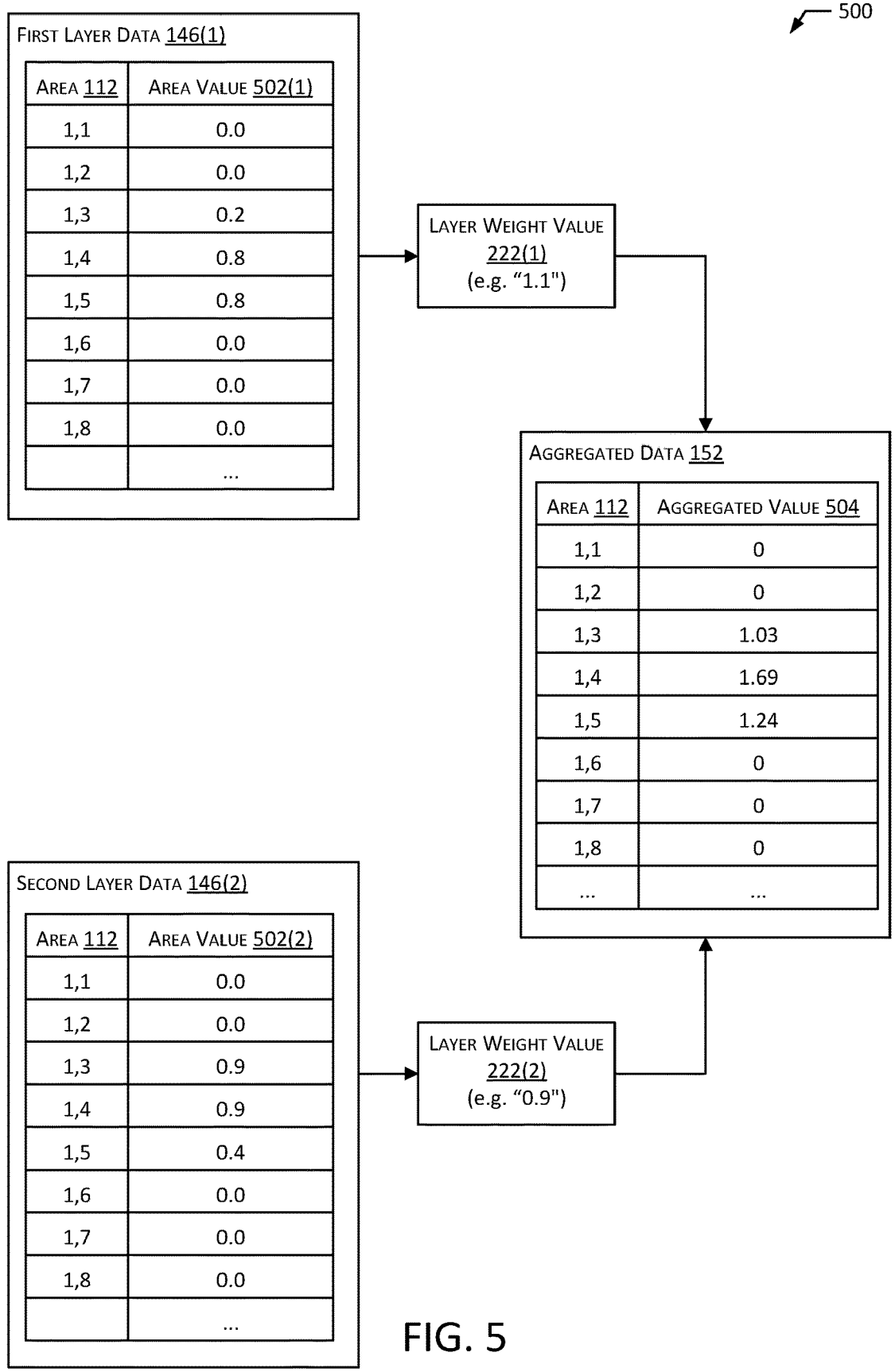
FIG. 5 illustrates determining aggregated data, according to some implementations.

FIG. 5 illustrates at 500 determining aggregated data 152, according to some implementations. By way of illustration, and not as a limitation, first layer data 146(1) and second layer data 146(2) are shown. Each represents a plurality of areas 112 and their respective area values 502. In some implementations, the area values 502 may be determined using the hysteresis functions described previously.

Associated with each instance of layer data 146 is a respective layer weight value 222. In this illustration, the first layer data 146(1) is associated with a first layer weight value 222(1) with a value of "1.1" while the second layer data 146(2) is associated with a second layer weight value 222(2) with a value of "0.9".

In this illustration, the aggregation module 150 determines the aggregated data 152 using a weighted sum in which the respective area values 502 are multiplied by their respective layer weight values 222, and the resulting products are summed to produce an aggregated value 504. The resulting aggregated data 152 comprises information that is representative of the areas 112, based on the information in the layer data 146 subject to the respective layer weight values 222.

In other implementations, the aggregation module 150 may use other functions to determine the aggregated values 504 of the aggregate data 152. For example, instead of multiplication, a sum, difference, log, or other function may be used. Different functions may be also used for different layers of layer data 146. For example, the first layer weight value 222(1) may be multiplied by area values 502 for the first layer data 146(1) while a twelfth layer weight value 222(12) may be subtracted from area values 502 for twelfth layer data 146(12).

Figure 6:
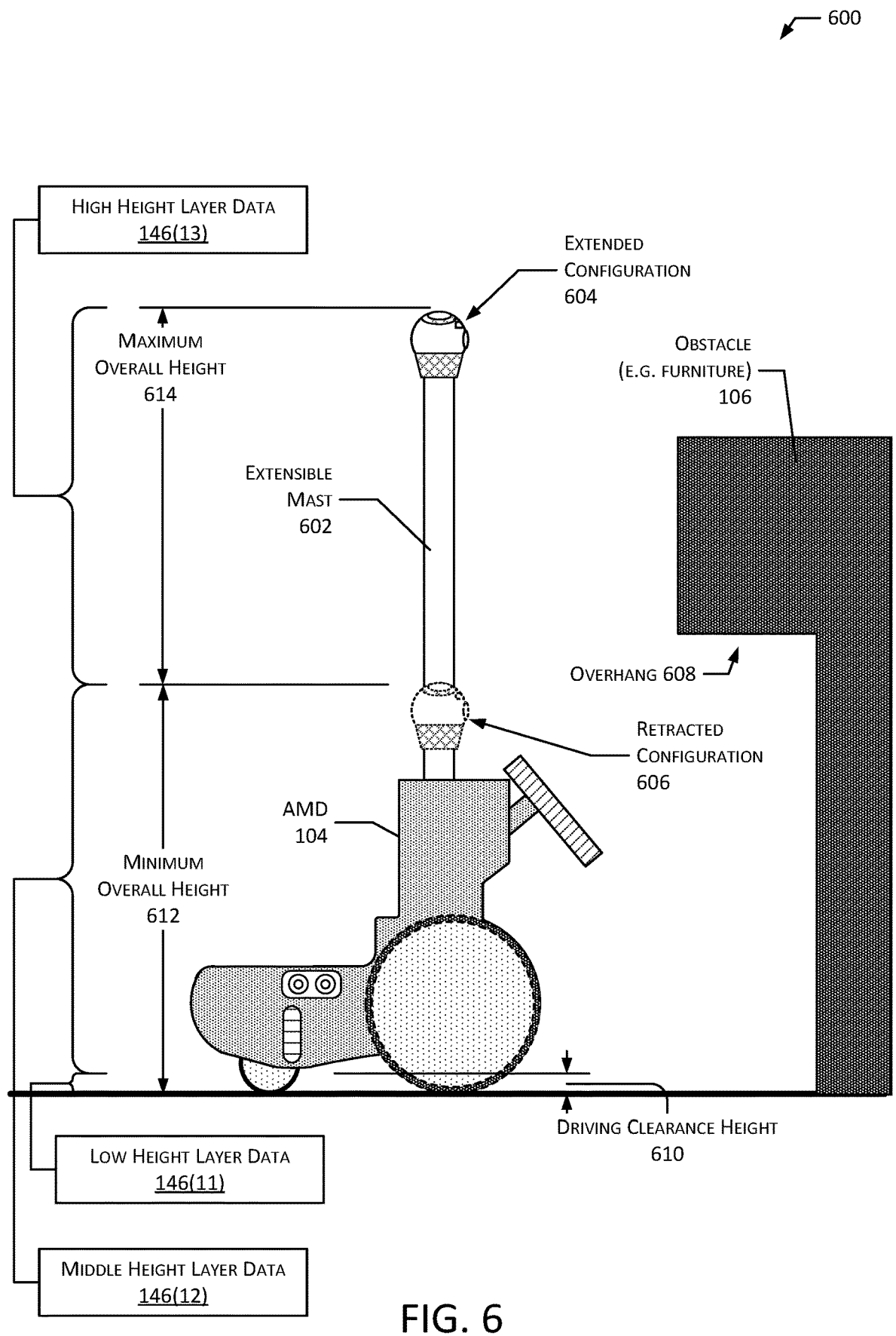
FIG. 6 illustrates layer data representative of obstacles at different heights, according to some implementations.

FIG. 6 illustrates at 600 layer data 146 representative of obstacles 106 at different heights, according to some implementations. The AMD 104 has a footprint representative of the area on the floor that it occupies. The AMD 104 also has a height which it extends above the floor. In some implementations, the AMD 104 is fixed in height, while in other implementations the AMD 104 may vary in height. For example, the AMD 104 depicted in this figure includes an extensible mast 602 that may be raised to an extended configuration 604 or lowered to a retracted configuration 606.

The physical space 102 may include obstacles 106 that may prevent the AMD 104 from traversing in some configurations, and not in others. In this illustration, an obstacle 106 is depicted which has an overhang 608. For example, the obstacle 106 may comprise a chair, table, bed, counter, and so forth. The AMD 104 is able to move in more places with respect to the obstacle 106 in the retracted configuration 606, compared to the extended configuration 604. For example, the AMD 104 may move beneath the overhang 608 while in the retracted configuration 606. Continuing the example, if the AMD 104 is in the extended configuration 604 is will not be able to move beneath the overhang 608 because the extensible mast 602 would collide with the obstacle 106.

In some implementations, the layer data 146 may include one or more layers that are representative of obstacles 106 that are located within a particular range of heights. In this illustration, three ranges of heights relative to the floor are depicted: a driving clearance height 610, a minimum overall height 612, and a maximum overall height 614.

The driving clearance height 610 may be determined by the size of an obstacle 106 that the AMD 104 able to successfully traverse while moving. For example, the driving clearance height 610 may be 1 centimeter (cm), corresponding to the ability of the AMD 104 to successfully drive over obstacles 106 or surface features on the floor such as flooring transitions that are less than or equal to 1 cm in height.

The minimum overall height 612 corresponds to the "shortest" or lowest physical configuration that the AMD 104 is able to operate in. For example, the minimum overall height 612 may comprise the height of the highest point of the AMD 104 in the retracted configuration 606. In another example, if the AMD 104 utilizes legs for locomotion, the minimum overall height 612 may comprise the height of the highest point of the AMD 104 in a crouched position while still able to walk or shuffle.

The maximum overall height 614 may correspond to the "tallest" or highest physical configuration that the AMD 104 is able to operate in. For example, the maximum overall height 614 may comprise the height of the highest point of the AMD 104 in the extended configuration 604. In another example, if the AMD 104 includes arms or other manipulators, the maximum overall height 614 may comprise the height of the highest point of the manipulators of the AMD 104 in their maximum extension upwards.

Information about obstacles 106 that are within the driving clearance height 610 may be stored within a low height layer data 146(11). Information about obstacles 106 that are within the range of the floor to the minimum overall height 612 may be stored within a middle height layer data 146(12). Information about obstacles 106 that are within the range from the minimum overall height 612 to the maximum overall height 614 may be stored within a high height layer data 146(13).

In some implementations, "padding" or "buffer" value of the heights may be used. For example, if the actual minimum overall height 612 is 45 cm, the minimum overall height 612 used may be 47 cm.

The same physical obstacles 106 may be represented in multiple layers of layer data 146. For example, some portions of the obstacle 106 depicted in FIG. 6 will be represented in the low height layer data 146(11), the middle height layer data 146(12), and the high height layer data 146(13).

By providing layer data 146 that is indicative of particular ranges of heights, operation of the AMD 104 is improved. For example, aggregated data 152 may be determined using an aggregation profile 148 that corresponds to the retracted configuration 606. This aggregated data 152 may have layer weight values 222 of "0" for the high height layer data 146(13), as the AMD 104 is able to move beneath those high obstacles. As a result, the aggregated data 152 may present fewer obstacles and allow for more possible paths for the autonomous navigation module 160 to use to move the AMD 104.

Figure 7:
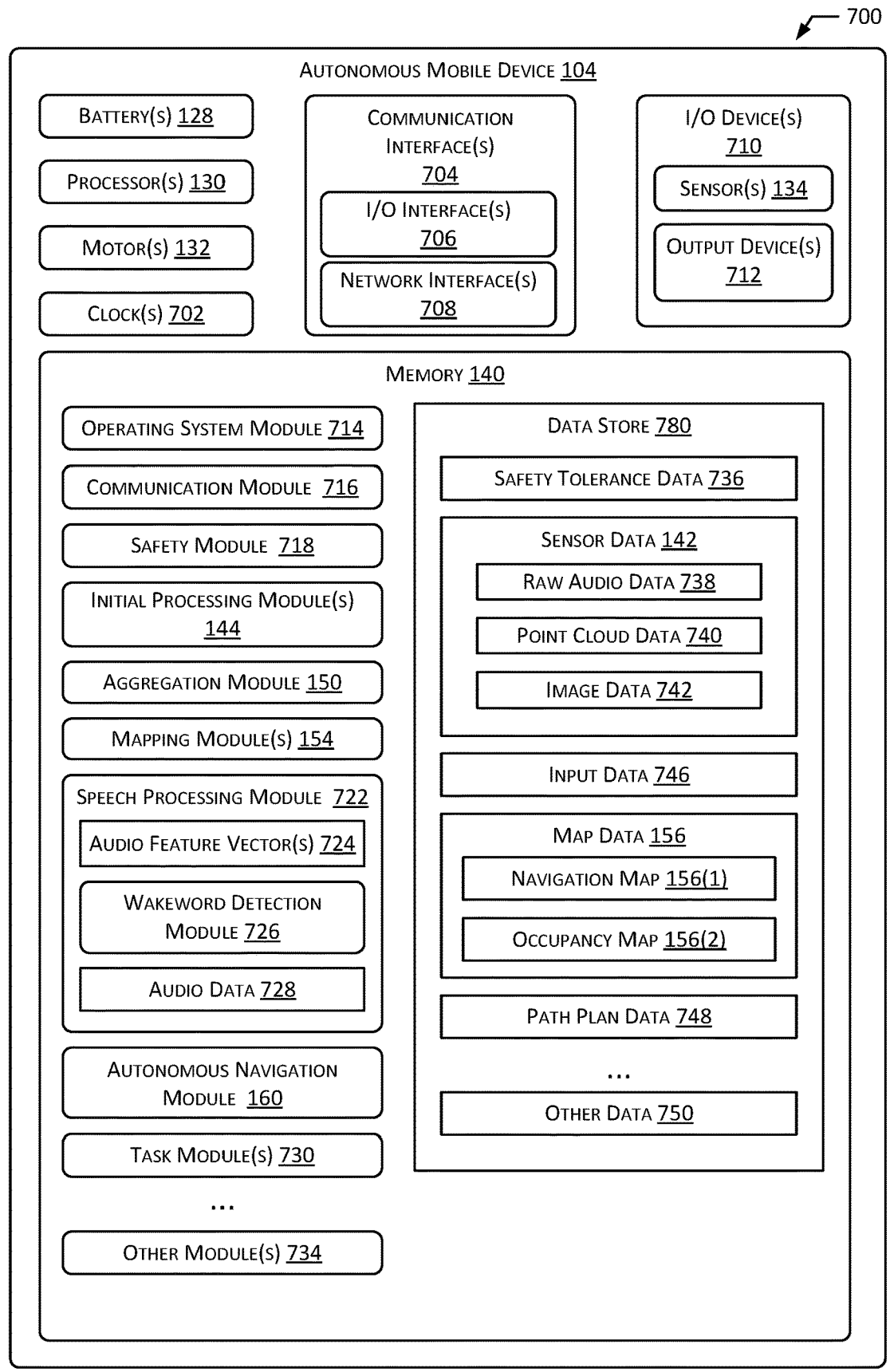
FIG. 7 is a block diagram of the components of the AMD, according to some implementations.

FIG. 7 is a block diagram 700 of the AMD 104, according to some implementations. The AMD 104 may include one or more batteries 128 to provide electrical power suitable for operating the components in the AMD 104. In some implementations, other devices may be used to provide electrical power to the AMD 104. For example, power may be provided by wireless power transfer, capacitors, fuel cells, storage flywheels, and so forth.

The AMD 104 may include one or more hardware processors 130 (processors) configured to execute one or more stored instructions. The processors 130 may comprise one or more cores. The processors 130 may include microcontrollers, systems on a chip, field programmable gate arrays, digital signal processors, graphic processing units, general processing units, and so forth.

The AMD 104 may include one or more motors 132, actuators, or other devices to cause the AMD 104 or a portion thereof to move. For example, the one or more motors 132 may operate one or more wheels, legs, and so forth to move the AMD 104 from a first location in the physical space 102 to a second location in the physical space 102.

One or more clocks 702 may provide information indicative of date, time, ticks, and so forth. For example, the processor 130 may use data from the clock 702 to associate a particular time with an action, sensor data 142, and so forth.

The AMD 104 may include one or more communication interfaces 704 such as input/output (I/O) interfaces 706, network interfaces 708, and so forth. The communication interfaces 704 enable the AMD 104, or components thereof, to communicate with other devices 176 or components. The communication interfaces 704 may include one or more I/O interfaces 706. The I/O interfaces 706 may comprise Inter-Integrated Circuit (I2C), Serial Peripheral Interface bus (SPI), Universal Serial Bus (USB) as promulgated by the USB Implementers Forum, RS-232, and so forth.

The I/O interface(s) 706 may couple to one or more I/O device 710. The I/O device 710 may include input devices such as one or more of a sensor 134, keyboard, mouse, scanner, and so forth. The I/O device 710 may also include output devices 712 such as one or more of a motor 132, light, speaker, display, projector, printer, and so forth. In some embodiments, the I/O devices 710 may be physically incorporated with the AMD 104 or may be externally placed. The sensors 134 and I/O devices 710 are discussed in more detail with regard to FIG. 8.

The AMD 104 may include one or more network interfaces 708. The network interfaces 708 may include devices to connect to personal area networks (PANs), local area networks (LANs), wireless local area networks (WLANS), wide area networks (WANs), and so forth. For example, the network interfaces 708 may include devices compatible with Ethernet, Wi-Fi, Bluetooth, Bluetooth Low Energy, ZigBee, and so forth.

The AMD 104 includes one or more memories 140. The memory 140 may comprise one or more non-transitory computer-readable storage media (CRSM). The CRSM may be any one or more of an electronic storage medium, a magnetic storage medium, an optical storage medium, a quantum storage medium, a mechanical computer storage medium, and so forth. The memory 140 provides storage of computer-readable instructions, data structures, program modules, and other data for the operation of the AMD 104. A few example functional modules are shown stored in the memory 140, although the same functionality may alternatively be implemented in hardware, firmware, or as a system on a chip (SoC).

The memory 140 may include at least one operating system (OS) module 714. The OS module 714 is configured to manage hardware resource devices such as the I/O interfaces 706, the I/O device 710, the communication interfaces 704, and provide various services to applications or modules executing on the processors 130. The OS module 714 may implement a variant of the FreeBSD operating system as promulgated by the FreeBSD Project; other UNIX or UNIX-like variants; a variation of the Linux operating system as promulgated by Linus Torvalds; the Windows operating system from Microsoft Corporation of Redmond, Washington, USA; the Robot Operating System (ROS), and so forth.

Also stored in the memory 140 may be a data store 780 and one or more of the following modules. These modules may be executed as foreground applications, background tasks, daemons, and so forth. The data store 780 may use a flat file, database, linked list, tree, executable code, script, or other data structure to store information. In some implementations, the data store 780 or a portion of the memory 140 may be distributed across one or more other devices 176 including other AMDs 104, servers 180, network attached storage devices, and so forth.

A communication module 716 may be configured to establish communication with other devices 176, such as other AMDs 104, an external server 180, a docking station 182, and so forth. The communications may be authenticated, encrypted, and so forth.

Other modules within the memory 140 may include a safety module 718, initial processing modules 144, the aggregation module 150, the one or more mapping modules 154, the autonomous navigation module 160, a speech processing module 722, one or more task modules 730, or other modules 734. The modules may access memory within the data store 780, including safety tolerance data 736, sensor data 142, other data 750, and so forth.

The safety module 718 may access the safety tolerance data 736 to determine within what tolerances the AMD 104 may operate safely within the physical space 102. For example, the safety module 718 may be configured to stop the AMD 104 from moving when an extensible mast 602 of the AMD 104 is extended. In another example, the safety tolerance data 736 may specify a minimum sound threshold which, when exceeded, stops all movement of the AMD 104. Continuing this example, detection of sound such as a human yell would stop the AMD 104. In another example, the safety module 718 may access safety tolerance data 736 that specifies a minimum distance from an object that the AMD 104 is to maintain. Continuing this example, when a sensor 134 detects an object has approached to less than or equal to the minimum distance, all movement of the AMD 104 may be stopped. Movement of the AMD 104 may be stopped by one or more of inhibiting operations of one or more of the motors 132, issuing a command to stop motor operation, disconnecting power from one or more the motors 132, and so forth. The safety module 718 may be implemented as hardware, software, or a combination thereof.

The safety module 718 may control other factors, such as a maximum speed of the AMD 104 based on information obtained by the sensors 134, precision and accuracy of the sensor data 142, and so forth. For example, detection of an object by an optical sensor may include some error, such as when the distance to the object comprises a weighted average between the object and a background. As a result, the maximum speed permitted by the safety module 718 may be based on one or more factors such as the weight of the AMD 104, nature of the floor, distance to the object, and so forth. In the event that the maximum permissible speed differs from the maximum speed permitted by the safety module 718, the lesser speed may be utilized.

In some implementations, the mapping module(s) 154 uses the occupancy map 156(2) as input to generate the navigation map 156(1). In other implementations, the mapping module(s) 154 may produce the navigation map 156(1) by inflating or enlarging the obstacles indicated by the occupancy map 156(2). One or more inflation parameters may be used during operation. The inflation parameters provide information such as inflation distance, inflation adjustment values, and so forth. In some implementations, the inflation parameters may be based at least in part on the sensor FOV 110, sensor blind spot, physical dimensions of the AMD 104, and so forth.

The speech processing module 722 may be used to process utterances of the user 108. Microphones may acquire audio in the presence of the AMD 104 and may send raw audio data 738 to an acoustic front end (AFE). The AFE may transform the raw audio data 738 (for example, a single-channel, 16-bit audio stream sampled at 16 kHz), captured by the microphone, into audio feature vectors 724 that may ultimately be used for processing by various components, such as a wakeword detection module 726, speech recognition engine, or other components. The AFE may reduce noise in the raw audio data 738. The AFE may also perform acoustic echo cancellation (AEC) or other operations to account for output audio data that may be sent to a speaker of the AMD 104 for output. For example, the AMD 104 may be playing music or other audio that is being received from a network 178 in the form of output audio data. To avoid the output audio interfering with the device's ability to detect and process input audio, the AFE or other component may perform echo cancellation to remove the output audio data from the input raw audio data 738, or other operations.

The AFE may divide the raw audio data 738 into frames representing time intervals for which the AFE determines a number of values (i.e., features) representing qualities of the raw audio data 738, along with a set of those values (i.e., a feature vector or audio feature vector 724) representing features/qualities of the raw audio data 738 within each frame. A frame may be a certain period of time, for example a sliding window of 75 ms of audio data 728 taken every 10 ms, or the like. Many different features may be determined, as known in the art, and each feature represents some quality of the audio that may be useful for automatic speech recognition (ASR) processing, wakeword detection, presence detection, or other operations. A number of approaches may be used by the AFE to process the raw audio data 738, such as mel-frequency cepstral coefficients (MFCCs), log filter-bank energies (LFBEs), perceptual linear predictive (PLP) techniques, neural network feature vector techniques, linear discriminant analysis, semi-tied covariance matrices, or other approaches known to those skilled in the art.

The audio feature vectors 724 (or the raw audio data 738) may be input into a wakeword detection module 726 that is configured to detect keywords spoken in the audio. The wakeword detection module 726 may use various techniques to determine whether audio data 728 includes speech. Some embodiments may apply voice activity detection (VAD) techniques. Such techniques may determine whether speech is present in an audio input based on various quantitative aspects of the audio input, such as the spectral slope between one or more frames of the audio input; the energy levels of the audio input in one or more spectral bands; the signal-to-noise ratios of the audio input in one or more spectral bands; or other quantitative aspects. In other embodiments, the AMD 104 may implement a limited classifier configured to distinguish speech from background noise. The classifier may be implemented by techniques such as linear classifiers, support vector machines, and decision trees. In still other embodiments, Hidden Markov Model (HMM) or Gaussian Mixture Model (GMM) techniques may be applied to compare the audio input to one or more acoustic models in speech storage, which acoustic models may include models corresponding to speech, noise (such as environmental noise or background noise), or silence. Still other techniques may be used to determine whether speech is present in the audio input.

Once speech is detected in the audio received by the AMD 104 (or separately from speech detection), the AMD 104 may use the wakeword detection module 726 to perform wakeword detection to determine when a user 108 intends to speak a command to the AMD 104. This process may also be referred to as keyword detection, with the wakeword being a specific example of a keyword. Specifically, keyword detection is typically performed without performing linguistic analysis, textual analysis, or semantic analysis. Instead, incoming audio is analyzed to determine if specific characteristics of the audio match preconfigured acoustic waveforms, audio signatures, or other data to determine if the incoming audio "matches" stored audio data corresponding to a keyword.

Thus, the wakeword detection module 726 may compare audio data 728 to stored models or data to detect a wakeword. One approach for wakeword detection applies general large vocabulary continuous speech recognition (LVCSR) systems to decode the audio signals, with wakeword searching conducted in the resulting lattices or confusion networks. LVCSR decoding may require relatively high computational resources. Another approach for wakeword spotting builds HMMs for each key wakeword word and non-wakeword speech signals respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on keyword presence. This approach can be extended to include discriminative information by incorporating a hybrid deep neural network (DNN) Hidden Markov Model (HMM) decoding framework. In another embodiment, the wakeword spotting system may be built on DNN/recursive neural network (RNN) structures directly, without HMM involved. Such a system may estimate the posteriors of wakewords with context information, either by stacking frames within a context window for DNN, or using RNN. Following on, posterior threshold tuning or smoothing is applied for decision making. Other techniques for wakeword detection, such as those known in the art, may also be used.

Once the wakeword is detected, circuitry or applications of the local AMD 104 may "wake" and begin transmitting audio data 728 (which may include one or more of the raw audio data 738 or the audio feature vectors 724) to one or more server(s) 180 for speech processing. The audio data 728 corresponding to audio obtained by the microphone may be processed locally on one or more of the processors 130, sent to a server 180 for routing to a recipient device or may be sent to the server 180 for speech processing for interpretation of the included speech (either for purposes of enabling voice-communications and/or for purposes of executing a command in the speech). The audio data 728 may include data corresponding to the wakeword, or the portion of the audio data 728 corresponding to the wakeword may be removed by the AMD 104 before processing by the speech processing module 722, prior to sending to the server 180, and so forth.

The speech processing module 722 may include or access an automated speech recognition (ASR) module. The ASR module may accept as input raw audio data 738, audio feature vectors 724, or other sensor data 142 and so forth and may produce as output the input data 746 comprising a text string or other data representation. The input data 746 comprising the text string or other data representation may be processed by the speech processing module 722 to determine the command to be executed. For example, the utterance of the command "robot, come here" may result in input data 746 comprising the text string "come here". The wakeword "robot" may be omitted from the input data 746.

The mapping module(s) 154 may use one or more simultaneous localization and mapping ("SLAM") techniques. The SLAM algorithms may utilize one or more of maps, algorithms, beacons, or other techniques to navigate. The autonomous navigation module 160 may use the navigation map 156(1) to determine a set of possible paths along which the AMD 104 may move. One of these may be selected and used to determine path plan data 748 indicative of a path. For example, a possible path that is the shortest or has the fewest turns may be selected and used to determine the path. The path is then subsequently used to determine a set of commands that drive the motors 132 connected to the wheels. For example, the autonomous navigation module 160 may determine the current location within the physical space 102 and determine path plan data 748 that describes the path to a destination location such as the docking station 182.

The autonomous navigation module 160 may utilize various techniques during processing of sensor data 142. For example, image data 742 obtained from cameras on the AMD 104 may be processed to determine one or more of corners, edges, planes, and so forth. In some implementations, corners may be detected, and the coordinates of those corners may be used to produce point cloud data 740. This point cloud data 740 may then be used for SLAM or other purposes associated with mapping, navigation, and so forth.

The AMD 104 may move responsive to a determination made by an onboard processor 130, in response to a command received from one or more communication interfaces 704, as determined from the sensor data 142, and so forth. For example, an external server 180 may send a command that is received using the network interface 708. This command may direct the AMD 104 to proceed to find a particular user 108, follow a particular user 108, and so forth. The AMD 104 may then process this command and use the autonomous navigation module 160 to determine the directions and distances associated with carrying out the command. For example, the command to "come here" may result in the task module 730 sending a command to the autonomous navigation module 160 to move the AMD 104 to a particular location near the user 108 and orient the AMD 104 in a particular direction.

The AMD 104 may connect to the network 178 using one or more of the network interfaces 708. In some implementations, one or more of the modules or other functions described here may execute on the processors 130 of the AMD 104, on the server 180, or a combination thereof. For example, one or more servers 180 may provide various functions, such as ASR, natural language understanding (NLU), providing content such as audio or video to the AMD 104, and so forth.

The other modules 734 may provide other functionality, such as object recognition, speech synthesis, user identification, and so forth. The other modules 734 may comprise a speech synthesis module that is able to convert text data to human speech. For example, the speech synthesis module may be used by the AMD 104 to provide speech that a user 108 is able to understand.

The data store 780 may store the other data 750 as well. For example, localization settings may indicate local preferences such as language, user identifier data may be stored that allows for identification of a particular user, and so forth.

Modules described herein, such as the mapping module(s) 154, may provide various processing functions such as de-noising, filtering, and so forth. Processing of sensor data 142, such as image data 742 from a camera, may be performed by a module implementing, at least in part, one or more of the following tools or techniques. In one implementation, processing of image data 742 may be performed, at least in part, using one or more tools available in the OpenCV library as developed by Intel Corporation of Santa Clara, California, USA; Willow Garage of Menlo Park, California, USA; and Itseez of Nizhny Novgorod, Russia. In another implementation, functions available in the OKAO machine vision library as promulgated by Omron Corporation of Kyoto, Japan, may be used to process the sensor data 142. In still another implementation, functions such as those in the Machine Vision Toolbox (MVTB) available using MATLAB as developed by MathWorks, Inc. of Natick, Massachusetts, USA, may be utilized.

Techniques such as artificial neural networks (ANNs), convolutional neural networks (CNNs), deep CNNs (DCNNs), active appearance models (AAMs), active shape models (ASMs), principal component analysis (PCA), cascade classifiers, and so forth, may also be used to process the sensor data 142 or other data. For example, the ANN may be trained using a supervised learning algorithm such that object identifiers are associated with images of particular objects within training images provided to the ANN. Once trained, the ANN may be provided with the sensor data 142 and produce output indicative of the object identifier.

Figure 8:
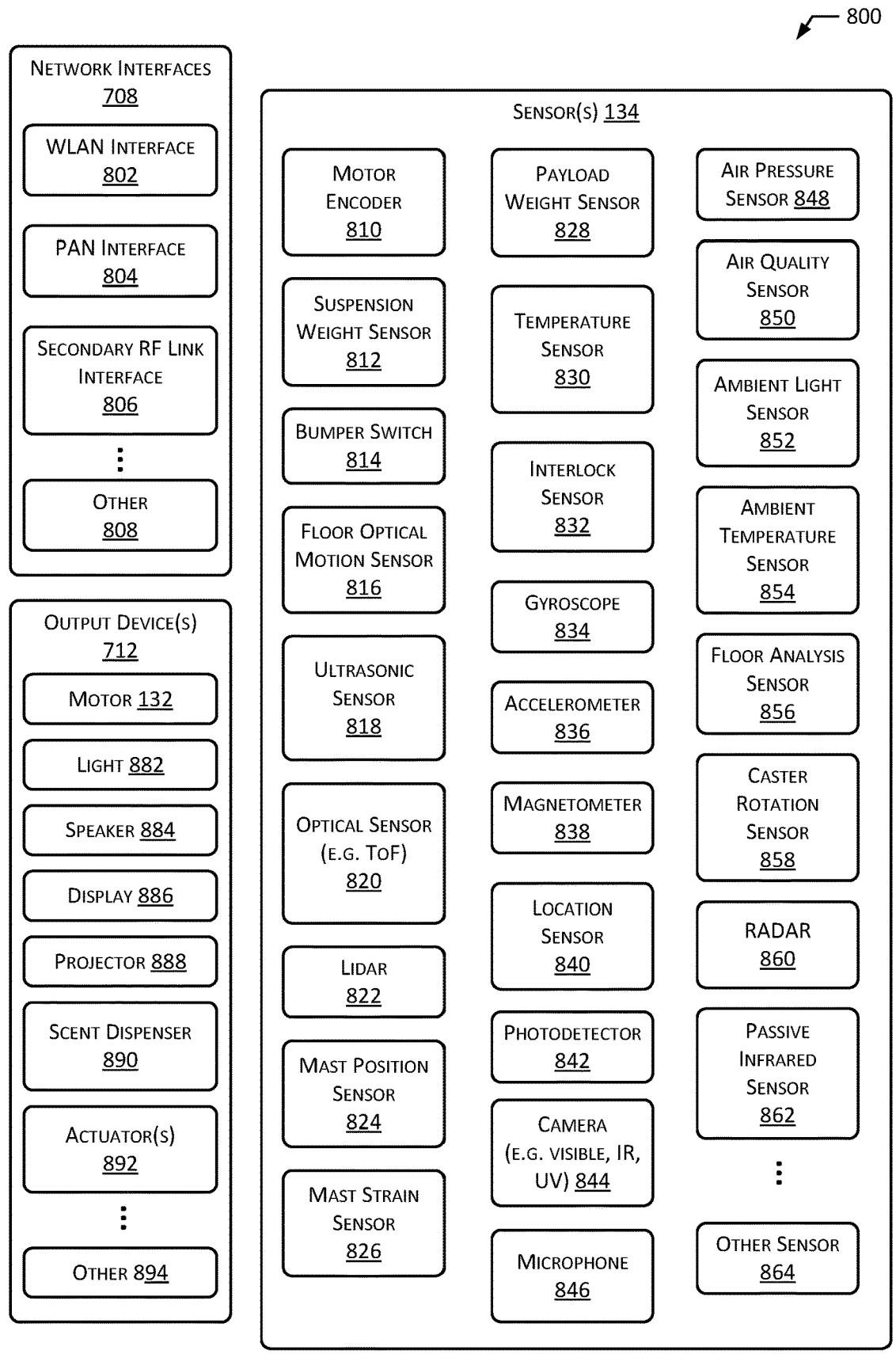
FIG. 8 is a block diagram of some components of the AMD, such as network interfaces, sensors, and output devices, according to some implementations.

FIG. 8 is a block diagram 800 of some components of the AMD 104 such as network interfaces 708, sensors 134, and output devices 712, according to some implementations. The components illustrated here are provided by way of illustration and not necessarily as a limitation. For example, the AMD 104 may utilize a subset of the particular network interfaces 708, output devices 712, or sensors 134 depicted here, or may utilize components not pictured. One or more of the sensors 134, output devices 712, or a combination thereof may be included on a moveable component that may be panned, tilted, rotated, or any combination thereof with respect to a chassis of the AMD 104.

The network interfaces 708 may include one or more of a WLAN interface 802, PAN interface 804, secondary radio frequency (RF) link interface 806, or other interface 808. The WLAN interface 802 may be compliant with at least a portion of the Wi-Fi specification. For example, the WLAN interface 802 may be compliant with at least a portion of the IEEE 802.11 specification as promulgated by the Institute of Electrical and Electronics Engineers (IEEE). The PAN interface 804 may be compliant with at least a portion of one or more of the Bluetooth, wireless USB, Z-Wave, ZigBee, or other standards. For example, the PAN interface 804 may be compliant with the Bluetooth Low Energy (BLE) specification.

The secondary RF link interface 806 may comprise a radio transmitter and receiver that operate at frequencies different from or using modulation different from the other interfaces. For example, the WLAN interface 802 may utilize frequencies in the 7.4 GHz and 5 GHz Industrial Scientific and Medicine (ISM) bands, while the PAN interface 804 may utilize the 7.4 GHz ISM bands. The secondary RF link interface 806 may comprise a radio transmitter that operates in the 900 MHz ISM band, within a licensed band at another frequency, and so forth. The secondary RF link interface 806 may be utilized to provide backup communication between the AMD 104 and other devices 176 in the event that communication fails using one or more of the WLAN interface 802 or the PAN interface 804. For example, in the event the AMD 104 travels to an area within the physical space 102 that does not have Wi-Fi coverage, the AMD 104 may use the secondary RF link interface 806 to communicate with another device such as a specialized access point, docking station 182, or other AMD 104.

The other 808 network interfaces may include other equipment to send or receive data using other wavelengths or phenomena. For example, the other 808 network interface may include an ultrasonic transceiver used to send data as ultrasonic sounds, a visible light system that communicates by modulating a visible light source such as a light-emitting diode, and so forth. In another example, the other 808 network interface may comprise a wireless wide area network (WWAN) interface or a wireless cellular data network interface. Continuing the example, the other 808 network interface may be compliant with at least a portion of the LTE, 5G, 6G, or other standards.

The AMD 104 may include one or more of the following sensors 134. The sensors 134 depicted here are provided by way of illustration and not necessarily as a limitation. It is understood that other sensors 134 may be included or utilized by the AMD 104, while some sensors 134 may be omitted in some configurations.

A motor encoder 810 provides information indicative of the rotation or linear extension of a motor 132. The motor 132 may comprise a rotary motor, or a linear actuator. In some implementations, the motor encoder 810 may comprise a separate assembly such as a photodiode and encoder wheel that is affixed to the motor 132. In other implementations, the motor encoder 810 may comprise circuitry configured to drive the motor 132. For example, the autonomous navigation module 160 may utilize the data from the motor encoder 810 to estimate a distance traveled.

A suspension weight sensor 812 provides information indicative of the weight of the AMD 104 on the suspension system for one or more of the wheels or the caster. For example, the suspension weight sensor 812 may comprise a switch, strain gauge, load cell, photodetector 842, or other sensing element that is used to determine whether weight is applied to a particular wheel, or whether weight has been removed from the wheel. In some implementations, the suspension weight sensor 812 may provide binary data such as a "1" value indicating that there is a weight applied to the wheel, while a "0" value indicates that there is no weight applied to the wheel. In other implementations, the suspension weight sensor 812 may provide an indication such as so many kilograms of force or newtons of force. The suspension weight sensor 812 may be affixed to one or more of the wheels or the caster. In some situations, the safety module 718 may use data from the suspension weight sensor 812 to determine whether or not to inhibit operation of one or more of the motors 132. For example, if the suspension weight sensor 812 indicates no weight on the suspension, the implication is that the AMD 104 is no longer resting on its wheels, and thus operation of the motors 132 may be inhibited. In another example, if the suspension weight sensor 812 indicates weight that exceeds a threshold value, the implication is that something heavy is resting on the AMD 104 and thus operation of the motors 132 may be inhibited. For example, the threshold value may comprise a weight of a load that compresses a suspension system to a minimum height, or results in a mass that exceeds a torque output of the motors 132 to maintain a minimum acceleration.

One or more bumper switches 814 provide an indication of physical contact between a bumper or other member that is in mechanical contact with the bumper switch 814. The safety module 718 utilizes sensor data 142 obtained by the bumper switches 814 to modify the operation of the AMD 104. For example, if the bumper switch 814 associated with a front of the AMD 104 is triggered, the safety module 718 may drive the AMD 104 backwards.

A floor optical motion sensor (FOMS) 816 provides information indicative of motion of the AMD 104 relative to the floor or other surface underneath the AMD 104. In one implementation, the FOMS 816 may comprise a light source such as light-emitting diode (LED), an array of photodiodes, and so forth. In some implementations, the FOMS 816 may utilize an optoelectronic sensor, such as a low-resolution two-dimensional array of photodiodes. Several techniques may be used to determine changes in the data obtained by the photodiodes and translate this into data indicative of a direction of movement, velocity, acceleration, and so forth. In some implementations, the FOMS 816 may provide other information, such as data indicative of a pattern present on the floor, composition of the floor, color of the floor, and so forth. For example, the FOMS 816 may utilize an optoelectronic sensor that may detect different colors or shades of gray, and this data may be used to generate floor characterization data. The floor characterization data may be used for navigation.

An ultrasonic sensor 818 utilizes sounds in excess of 70 kHz to determine a distance from the sensor 134 to an object. The ultrasonic sensor 818 may comprise an emitter such as a piezoelectric transducer and a detector such as an ultrasonic microphone. The emitter may generate specifically timed pulses of ultrasonic sound while the detector listens for an echo of that sound being reflected from an object within the field of view 110. The ultrasonic sensor 818 may provide information indicative of a presence of an object, distance to the object, and so forth. Two or more ultrasonic sensors 818 may be utilized in conjunction with one another to determine a location within a two-dimensional plane of the object.

In some implementations, the ultrasonic sensor 818 or a portion thereof may be used to provide other functionality. For example, the emitter of the ultrasonic sensor 818 may be used to transmit data and the detector may be used to receive data transmitted that is ultrasonic sound. In another example, the emitter of an ultrasonic sensor 818 may be set to a particular frequency and used to generate a particular wave-form such as a sawtooth pattern to provide a signal that is audible to an animal, such as a dog or a cat.

An optical sensor 820 may provide sensor data 142 indicative of one or more of a presence or absence of an object, a distance to the object, or characteristics of the object. The optical sensor 820 may use time-of-flight (ToF), structured light, interferometry, or other techniques to generate the distance data. For example, ToF determines a propagation time (or "round-trip" time) of a pulse of emitted light from an optical emitter or illuminator that is reflected or otherwise returned to an optical detector. By dividing the propagation time in half and multiplying the result by the speed of light in air, the distance to an object may be determined. The optical sensor 820 may utilize one or more sensing elements. For example, the optical sensor 820 may comprise a 4×4 array of light sensing elements. Each individual sensing element may be associated with a field of view (FOV) 110 that is directed in a different way. For example, the optical sensor 820 may have four light sensing elements, each associated with a different 10° FOV 110, allowing the sensor to have an overall FOV 110 of 40°.

In another implementation, a structured light pattern may be provided by the optical emitter. A portion of the structured light pattern may then be detected on the object using a sensor 134 such as an image sensor or camera 844. Based on an apparent distance between the features of the structured light pattern, the distance to the object may be calculated. Other techniques may also be used to determine distance to the object. In another example, the color of the reflected light may be used to characterize the object, such as whether the object is skin, clothing, flooring, upholstery, and so forth. In some implementations, the optical sensor 820 may operate as a depth camera, providing a two-dimensional image of a scene, as well as data that indicates a distance to each pixel.

Data from the optical sensors 820 may be utilized for collision avoidance. For example, the safety module 718 and the autonomous navigation module 160 may utilize the sensor data 142 indicative of the distance to an object in order to prevent a collision with that object.

Multiple optical sensors 820 may be operated such that their FOV 110 overlap at least partially. To minimize or eliminate interference, the optical sensors 820 may selectively control one or more of the timing, modulation, or frequency of the light emitted. For example, a first optical sensor 820 may emit light modulated at 80 kHz while a second optical sensor 820 emits light modulated at 83 kHz.

A lidar 822 sensor provides information indicative of a distance to an object or portion thereof by utilizing laser light. The laser is scanned across a scene at various points, emitting pulses which may be reflected by objects within the scene. Based on the time-of-flight distance to that particular point, sensor data 142 may be generated that is indicative of the presence of objects and the relative positions, shapes, and so forth that are visible to the lidar 822. Data from the lidar 822 may be used by various modules. For example, the autonomous navigation module 160 may utilize point cloud data 740 generated by the lidar 822 for localization of the AMD 104 within the physical space 102.

The AMD 104 may include an extensible mast 602. A mast position sensor 824 provides information indicative of a position of the mast of the AMD 104. For example, the mast position sensor 824 may comprise limit switches associated with the mast extension mechanism that indicate whether the mast is at an extended or retracted position. In other implementations, the mast position sensor 824 may comprise an optical code on at least a portion of the mast that is then interrogated by an optical emitter and a photodetector 842 to determine the distance to which the mast is extended. In another implementation, the mast position sensor 824 may comprise an encoder wheel that is attached to a mast motor that is used to raise or lower the mast. The mast position sensor 824 may provide data to the safety module 718. For example, if the AMD 104 is preparing to move, data from the mast position sensor 824 may be checked to determine if the mast is retracted, and if not, the mast may be retracted prior to beginning movement.

A mast strain sensor 826 provides information indicative of a strain on the mast with respect to the remainder of the AMD 104. For example, the mast strain sensor 826 may comprise a strain gauge or load cell that measures a side-load applied to the mast or a weight on the mast or downward pressure on the mast. The safety module 718 may utilize sensor data 142 obtained by the mast strain sensor 826. For example, if the strain applied to the mast exceeds a threshold amount, the safety module 718 may direct an audible and visible alarm to be presented by the AMD 104.

The AMD 104 may include a modular payload bay. A payload weight sensor 828 provides information indicative of the weight associated with the modular payload bay. The payload weight sensor 828 may comprise one or more sensing mechanisms to determine the weight of a load. These sensing mechanisms may include piezoresistive devices, piezoelectric devices, capacitive devices, electromagnetic devices, optical devices, potentiometric devices, microelectromechanical devices, and so forth. The sensing mechanisms may operate as transducers that generate one or more signals based on an applied force, such as that of the load due to gravity. For example, the payload weight sensor 828 may comprise a load cell having a strain gauge and a structural member that deforms slightly when weight is applied. By measuring a change in the electrical characteristic of the strain gauge, such as capacitance or resistance, the weight may be determined. In another example, the payload weight sensor 828 may comprise a force sensing resistor (FSR). The FSR may comprise a resilient material that changes one or more electrical characteristics when compressed. For example, the electrical resistance of a particular portion of the FSR may decrease as the particular portion is compressed. In some implementations, the safety module 718 may utilize the payload weight sensor 828 to determine if the modular payload bay has been overloaded. If so, an alert or notification may be issued.

One or more device temperature sensors 830 may be utilized by the AMD 104. The device temperature sensors 830 provide temperature data of one or more components within the AMD 104. For example, a device temperature sensor 830 may indicate a temperature of one or more of the batteries 128, one or more motors 132, and so forth. In the event the temperature exceeds a threshold value, the component associated with that device temperature sensor 830 may be shut down. For example, the threshold value may be determined based on component specifications, such as a maximum permissible temperature of the batteries 128.

One or more interlock sensors 832 may provide data to the safety module 718 or other circuitry that prevents the AMD 104 from operating in an unsafe condition. For example, the interlock sensors 832 may comprise switches that indicate whether an access panel is open. The interlock sensors 832 may be configured to inhibit operation of the AMD 104 until the interlock switch indicates a safe condition is present.

A gyroscope 834 may provide information indicative of rotation of an object affixed thereto. For example, a gyroscope 834 may generate sensor data 142 that is indicative of a change in orientation of the AMD 104 or a portion thereof.

An accelerometer 836 provides information indicative of a direction and magnitude of an imposed acceleration. Data such as rate of change, determination of changes in direction, speed, and so forth may be determined using the accelerometer 836. The accelerometer 836 may comprise mechanical, optical, micro-electromechanical, or other devices. For example, the gyroscope 834 in the accelerometer 836 may comprise a prepackaged solid-state inertial measurement unit (IMU) that provides multiple axis gyroscopes 834 and accelerometers 836.

A magnetometer 838 may be used to determine an orientation by measuring ambient magnetic fields, such as the terrestrial magnetic field. For example, the magnetometer 838 may comprise a Hall effect transistor that provides output compass data indicative of a magnetic heading.

The AMD 104 may include one or more location sensors 840. The location sensors 840 may comprise an optical, radio, or other navigational system such as a global navigation satellite system (GNSS) receiver such as a global positioning system (GPS). For indoor operation, the location sensors 840 may comprise indoor position systems, such as using Wi-Fi Positioning Systems (WPS). The location sensors 840 may provide information indicative of a relative location, such as "living room" or an absolute location such as particular coordinates indicative of latitude and longitude, or displacement with respect to a predefined origin.

A photodetector 842 provides sensor data 142 indicative of impinging light. For example, the photodetector 842 may provide data indicative of a color, intensity, duration, and so forth.

A camera 844 generates sensor data 142 indicative of one or more images. The camera 844 may be configured to detect light in one or more wavelengths including, but not limited to, terahertz, infrared, visible, ultraviolet, and so forth. For example, an infrared camera 844 may be sensitive to wavelengths between approximately 700 nanometers and 1 millimeter. The camera 844 may comprise charge coupled devices (CCD), complementary metal oxide semiconductor (CMOS) devices, microbolometers, and so forth. The AMD 104 may use image data 742 acquired by the camera 844 for object recognition, navigation, collision avoidance, user communication, and so forth. For example, a pair of cameras 844 sensitive to infrared light may be mounted on the front of the AMD 104 to provide binocular stereo vision, with the sensor data 142 comprising images being sent to the autonomous navigation module 160. In another example, the camera 844 may comprise a 10 megapixel or greater camera that is used for videoconferencing or for acquiring pictures for the user.

The camera 844 may include a global shutter or a rolling shutter. The shutter may be mechanical or electronic. A mechanical shutter uses a physical device such as a shutter vane or liquid crystal to prevent light from reaching a light sensor. In comparison, an electronic shutter comprises a specific technique of how the light sensor is read out, such as progressive rows, interlaced rows, and so forth. With a rolling shutter, not all pixels are exposed at the same time. For example, with an electronic rolling shutter, rows of the light sensor may be read progressively, such that the first row on the sensor was taken at a first time while the last row was taken at a later time. As a result, a rolling shutter may produce various image artifacts, especially with regard to images in which objects are moving. In contrast, with a global shutter the light sensor is exposed all at a single time, and subsequently read out. In some implementations, the camera(s) 844, particularly those associated with navigation or autonomous operation, may utilize a global shutter. In other implementations, the camera(s) 844 providing images for use by the autonomous navigation module 160 may be acquired using a rolling shutter and subsequently may be processed to mitigate image artifacts.

One or more microphones 846 may be configured to acquire information indicative of sound present in the physical space 102. In some implementations, arrays of microphones 846 may be used. These arrays may implement beamforming techniques to provide for directionality of gain. The AMD 104 may use the one or more microphones 846 to acquire information from acoustic tags, accept voice input from users, determine a direction of an utterance, determine ambient noise levels, for voice communication with another user or system, and so forth.

An air pressure sensor 848 may provide information indicative of an ambient atmospheric pressure or changes in ambient atmospheric pressure. For example, the air pressure sensor 848 may provide information indicative of changes in air pressure due to opening and closing of doors, weather events, and so forth.

An air quality sensor 850 may provide information indicative of one or more attributes of the ambient atmosphere. For example, the air quality sensor 850 may include one or more chemical sensing elements to detect the presence of carbon monoxide, carbon dioxide, ozone, and so forth. In another example, the air quality sensor 850 may comprise one or more elements to detect particulate matter in the air, such as a photoelectric detector, ionization chamber, and so forth. In another example, the air quality sensor 850 may include a hygrometer that provides information indicative of relative humidity.

An ambient light sensor 852 may comprise one or more photodetectors 842 or other light-sensitive elements that are used to determine one or more of the color, intensity, or duration of ambient lighting around the AMD 104.

An ambient temperature sensor 854 provides information indicative of the temperature of the ambient physical space 102 proximate to the AMD 104. In some implementations, an infrared temperature sensor may be utilized to determine the temperature of another object at a distance.

A floor analysis sensor 856 may include one or more components that are used to generate at least a portion of floor characterization data. In one implementation, the floor analysis sensor 856 may comprise circuitry that may be used to determine one or more of the electrical resistance, electrical inductance, or electrical capacitance of the floor. For example, two or more of the wheels in contact with the floor may include an allegedly conductive pathway between the circuitry and the floor. By using two or more of these wheels, the circuitry may measure one or more of the electrical properties of the floor. Information obtained by the floor analysis sensor 856 may be used by one or more of the safety module 718, the autonomous navigation module 160, the task module 730, and so forth. For example, if the floor analysis sensor 856 determines that the floor is wet, the safety module 718 may decrease the speed of the AMD 104 and generate a notification alerting the user 108.

The floor analysis sensor 856 may include other components as well. For example, a coefficient of friction sensor may comprise a probe that comes into contact with the surface and determines the coefficient of friction between the probe and the floor.

A caster rotation sensor 858 provides data indicative of one or more of a direction of orientation, angular velocity, linear speed of the caster, and so forth. For example, the caster rotation sensor 858 may comprise an optical encoder and corresponding target that is able to determine that the caster transitioned from an angle of 0° at a first time to 49° at a second time.

The sensors 134 may include a radar 860. The radar 860 may be used to provide information as to a distance, lateral position, and so forth, to an object.

The sensors 134 may include a passive infrared (PIR) sensor 862. The PIR sensor 862 may be used to detect the presence of users, pets, hotspots, and so forth. For example, the PIR sensor 862 may be configured to detect infrared radiation with wavelengths between 8 and 14 micrometers.

The AMD 104 may include other sensors 864 as well. For example, a capacitive proximity sensor may be used to provide proximity data to adjacent objects. Other sensors 864 may include radio frequency identification (RFID) readers, near field communication (NFC) systems, coded aperture cameras, and so forth. For example, NFC tags may be placed at various points within the physical space 102 to provide landmarks for the autonomous navigation module 160. One or more touch sensors may be utilized to determine contact with a user 108 or other objects.

The AMD 104 may include one or more output devices 712. A motor 132 may be used to provide linear or rotary motion. A light 882 may be used to emit photons. A speaker 884 may be used to emit sound. A display 886 may comprise one or more of a liquid crystal display, light emitting diode display, electrophoretic display, cholesteric liquid crystal display, interferometric display, and so forth. The display 886 may be used to present visible information such as graphics, pictures, text, and so forth. In some implementations, the display 886 may comprise a touchscreen that combines a touch sensor and a display 886.

In some implementations, the AMD 104 may be equipped with a projector 888. The projector 888 may be able to project an image on a surface, such as the floor, wall, ceiling, and so forth.

A scent dispenser 890 may be used to emit one or more smells. For example, the scent dispenser 890 may comprise a plurality of different scented liquids that may be evaporated or vaporized in a controlled fashion to release predetermined amounts of each.

One or more moveable component actuators 892 may comprise an electrically operated mechanism such as one or more of a motor 132, solenoid, piezoelectric material, electroactive polymer, shape-memory alloy, and so forth. An actuator controller may be used to provide a signal or other input that operates one or more of the moveable component actuators 892 to produce movement of the moveable component.

In other implementations, other 894 output devices may be utilized. For example, the AMD 104 may include a haptic output device that provides output that produces particular touch sensations to the user 108. Continuing the example, a motor 132 with an eccentric weight may be used to create a buzz or vibration to allow the AMD 104 to simulate the purr of a cat.

The processes and methods discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage medium may include, but is not limited to, hard drives, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, physical spaces, and situations. Although the subject matter has been described in language specific to structural features or methodological acts, it is to be understood that the subject matter defined in the appended claims is not necessarily limited to the specific features or acts described. Rather, the specific features and acts are disclosed as illustrative forms of implementing the claims.

What is claimed is:

1. A device located in a physical space, the device comprising:
   a first sensor of a first type having a first field-of-view (FOV);
   a second sensor of a second type having a second FOV, wherein the first type is different from the second type;
   a third sensor having a third FOV;
   one or more processors; and
   one or more memories storing computer-executable instructions which, when executed using the one or more processors, cause the one or more processors to:
   determine first sensor data using the first sensor;

determine, based on the first sensor data, first layer data
that is representative of:
a first plurality of areas, wherein each area of the first
plurality of areas is associated with a correspond-
ing area in the physical space, and
a first plurality of values, wherein each value of the
first plurality of values is indicative of whether the
corresponding area includes an obstacle;
determine second sensor data using the second sensor;
determine, based on the second sensor data, second
layer data that is representative of:
the first plurality of areas, and
a second plurality of values, wherein each value of
the second plurality of values is indicative of
whether the corresponding area includes an
obstacle;
determine third sensor data using the third sensor;
determine, based on the third sensor data, third layer
data that is representative of:
the first plurality of areas, and
a third plurality of values, wherein each value of the
third plurality of values is indicative of whether
the corresponding area includes an obstacle;
determine a first aggregation profile associated with
performing a first task, wherein the first aggregation
profile indicates aggregation of the first layer data
and the second layer data;
determine first aggregated data based on the first layer
data and the second layer data;
determine a second aggregation profile associated with
performing a second task wherein the second aggre-
gation profile indicates aggregation of the first layer
data and the third layer data;
determine second aggregated data based on the first
layer data and the third layer data; and
move the device within the physical space based on one
or more of the first aggregated data or the second
aggregated data.

2. The device of claim 1, wherein the first sensor data is acquired within less than one second of acquiring the second sensor data.

3. The device of claim 1, wherein:
the first sensor operates using a first modality, and
the second sensor operates using a second modality that differs from the first modality.

4. The device of claim 1, wherein:
each value of the first plurality of values is associated with a first range of heights from a first height to a second height, and
each value of the second plurality of values is associated with a second range of heights from a third height to a fourth height.

5. The device of claim 1, wherein:
the first aggregation profile comprises:
a first weight value that is associated with the first layer data, and
a second weight value that is associated with the second layer data.

6. The device of claim 1, wherein the computer-execut-able instructions which, when executed using the one or more processors, further cause the one or more processors to one of:
determine that a value of the first aggregated data is greater than or equal to a threshold value indicating that the corresponding area includes an obstacle, or
determine that a value of the first aggregated data is less than the threshold value indicating that the corresponding area does not include an obstacle.

7. A method comprising:
acquiring first sensor data, wherein:
the first sensor data is acquired by a first sensor of a device, and
the first sensor is of a first type;
determining, based on the first sensor data, first layer data that is representative of:
a first plurality of areas, wherein each area of the first plurality of areas is associated with an area in a physical space, and
a first plurality of values, wherein each value of the first plurality of values is associated with a corresponding area of the first plurality of areas and is indicative of whether the corresponding area includes an obstacle;
acquiring second sensor data, wherein:
the second sensor data is acquired by a second sensor of the device, and
the second sensor is of a second type that is different from the first type;
determining, based on the second sensor data, second layer data that is representative of:
the first plurality of areas, and
a second plurality of values, wherein each value of the second plurality of values is associated with the corresponding area of the first plurality of areas and is indicative of whether the corresponding area includes an obstacle;
acquiring third sensor data, wherein the third sensor data is acquired by a third sensor of the device;
determining, based on the third sensor data, third layer data that is representative of:
the first plurality of areas, and
a third plurality of values, wherein each value of the third plurality of values is associated with the corresponding area of the first plurality of areas and is indicative of whether the corresponding area includes an obstacle;
determining an aggregation profile for performing a task;
based on the aggregation profile, selecting two of the first layer data, the second layer data, or the third layer data;
determining aggregated data based on the selected two of the first layer data, the second layer data, or the third layer data; and
causing the device to move within the physical space based on the aggregated data.

8. The method of claim 7, the determining the first layer data comprising:
determining, for the corresponding area of the first plurality of areas, that the corresponding area includes an obstacle with a height that is between a first range of heights from a first height to a second height; and
the determining the second layer data comprising:
determining, for the corresponding area of the first plurality of areas, that the corresponding area includes an obstacle with a height that is between a second range of heights from a third height to a fourth height.

9. The method of claim 7, the determining the first layer data comprising:
  determining, for the corresponding area of the first plurality of areas, that the corresponding area includes an obstacle that is associated with a first semantic class.

10. The method of claim 7, wherein:
  the aggregation profile comprises:
    a first weight value that is associated with one of the first layer data, the second layer data, or the third layer data, and
    a second weight value that is associated with one of the first layer data, the second layer data, or the third layer data.

11. The method of claim 7, the determining the aggregated data comprising one of:
  determining that a value of the aggregated data is greater than or equal to a threshold value indicating that the corresponding area includes an obstacle, or
  determining that a value of the aggregated data is less than the threshold value indicating that the corresponding area does not include an obstacle.

12. The method of claim 7, wherein:
  the first sensor data is acquired by the first sensor at a first time, the first sensor having a first modality; and
  the second sensor data is acquired by the second sensor at a second time, the second sensor having a second modality that is different from the first modality.

13. The method of claim 7, wherein:
  the first sensor data is acquired by the first sensor at a first time, the first sensor having a first modality;
  the second sensor data is acquired by the second sensor at a second time, the second sensor having a second modality that is different from the first modality; and
  the method further comprising:
    acquiring, at a third time, fourth sensor data using the first sensor;
    acquiring, at a fourth time, fifth sensor data using the second sensor;
    determining the first layer data based on the first sensor data and the fourth sensor data; and
    determining the second layer data based on the second sensor data and the fifth sensor data.

14. The method of claim 13, wherein the determining the first layer data includes using a first hysteresis function with respect to the first sensor data and the fourth sensor data.

15. The method of claim 7, wherein the determining the first layer data comprises one or more of:
  determining that the corresponding area of the first plurality of areas includes a transparent obstacle,
  determining that the corresponding area of the first plurality of areas includes a reflective obstacle,
  determining that the corresponding area of the first plurality of areas includes an obstacle that is in motion from a first location at a first time to a second location at a second time,
  determining that the corresponding area of the first plurality of areas includes an obstacle that is associated with a first semantic class, or
  determining that the corresponding area of the first plurality of areas includes an obstacle that is located at the first location at a third time and at a fourth time.

16. A device comprising:
  one or more processors;
  one or more memories storing computer-executable instructions which, when executed using the one or more processors, cause the one or more processors to:
    acquire first sensor data, wherein:
      the first sensor data is acquired by a first sensor of the device, and
      the first sensor is of a first type;
    determine state data associated with the device, wherein the state data is indicative of one or more of:
      a pose of the device,
      a location of the device, or
      an orientation of the device;
    determine, based at least in part on the first sensor data and the state data, first layer data that is representative of:
      a first plurality of areas, wherein each area of the first plurality of areas is associated with a corresponding area in a physical space, and
      a first plurality of values, wherein each value of the first plurality of values is indicative of whether the corresponding area includes an obstacle;
    acquire second sensor data, wherein:
      the second sensor data is acquired by a second sensor of the device, and
      the second sensor is of a second type that is different from the first type;
    determine, based at least in part on the second sensor data and the state data, second layer data that is representative of:
      the first plurality of areas, and
      a second plurality of values, wherein each value of the second plurality of values is indicative of whether the corresponding area includes an obstacle;
    determine aggregated data based on the first layer data and the second layer data; and
    move the device within the physical space based on the aggregated data.

17. The device of claim 16, wherein the computer-executable instructions which, when executed using the one or more processors, further cause the one or more processors to:
  determine a first aggregation profile comprising:
    a first weight value that is associated with the first layer data, and
    a second weight value that is associated with the second layer data; and
  wherein the aggregated data is further based on the first aggregation profile.

18. The device of claim 16, wherein:
  each value of the first plurality of values is associated with a first range of heights from a first height to a second height, and
  each value of the second plurality of values is associated with a second range of heights from a third height to a fourth height.

19. The device of claim 16, wherein the computer-executable instructions which, when executed using the one or more processors, further cause the one or more processors to one of:
  determine that a value of the aggregated data is greater than or equal to a threshold value indicating that the corresponding area includes an obstacle, or determine that a value of the aggregated data is less than the threshold value indicating that the corresponding area does not include an obstacle.

20. The device of claim 16, wherein the first sensor data is acquired at a first time; and wherein the computer-executable instructions which, when executed using the one or more processors, further cause the one or more processors to:

acquire, at a second time, third sensor data; and determine, using a first hysteresis function, the first plurality of values based on the first sensor data and the third sensor data.

* * * * *